United States Patent [19]

Engelke et al.

[11] Patent Number: 5,827,343
[45] Date of Patent: Oct. 27, 1998

[54] PROCESS FOR CHANGING THE BEND OF ANODICALLY BONDED FLAT COMPOSITE BODIES MADE OF GLASS AND METAL OR SEMICONDUCTOR MATERIALS

[76] Inventors: Heinrich Engelke, Schneppelwiese 1, D-31073 Grueneplan, Germany; Michael Harz, Jänschwalder Strasse 16, D-03048 Cottbus, Germany

[21] Appl. No.: 836,068

[22] PCT Filed: Sep. 27, 1995

[86] PCT No.: PCT/EP95/03825

§ 371 Date: Oct. 6, 1997

§ 102(e) Date: Oct. 6, 1997

[87] PCT Pub. No.: WO96/11806

PCT Pub. Date: Apr. 25, 1996

[30] Foreign Application Priority Data

Oct. 13, 1994 [DE] Germany .......................... 44 36 561.6

[51] Int. Cl.⁶ .................................................. C03B 23/00
[52] U.S. Cl. ..................... 65/102; 65/36; 65/40; 65/41; 65/54; 65/59.1; 65/59.4; 65/104; 65/154
[58] Field of Search .................... 65/36, 40, 41, 65/54, 59.1, 59.4, 102, 104, 154, DIG. 4

[56] References Cited

FOREIGN PATENT DOCUMENTS 1004013 1/1989 Japan .
3050141 3/1991 Japan .
6275481 9/1994 Japan .

OTHER PUBLICATIONS

Michael Harz and Winfried Brueckner, "Thermally Induced Bend Change of Anodically Bonded Silicon and PYREX Wafers" *Chemical Abstracts,* vol. 123, No. 26 (abstract No. 355935, Dec. 25, 1995 (Same in Semiconductor Wafe Bonding:Physics and Applications III, *Proceedings, Electrochemical Society,* (Jul. 1995), pp. 315–325.

S.M. Rekhson, "Annealing of Glass–to–Metal and Glass–to–Ceramic Seals, Part 1. Theory," *Glass Technology,* vol. 20, No. 1 (Feb. 1979), pp. 29, 30.

K. Sooriakumar et al., "Thermal Mismatch Strain in Anodically Bonded Silicon and Glass," *Extended Abstracts,* No. 1 (1993), pp. 1210, 1211.

George Wallis and Daniel I. Pomerantz, "Field Assisted Glass–Metal Sealing", *Journal of Applied Physics,* vol. 40, No. 10 (Sep. 1969) pp. 3946–3949.

*Primary Examiner*—Peter Chin
*Assistant Examiner*—Michael P. Colaianni
*Attorney, Agent, or Firm*—Elliott N. Kramsky

[57] ABSTRACT

A method for the controlled bending of anodically bonded two-dimensional composites of glass and metal or semiconductor materials. The composite is heated after bonding, for up to 200 hours to a temperature of from 250° C. to Tg–10 K. As a result of this heating, controlled compaction of the glass body and, hence, bending of the composite, are achieved to reduce or reverse any distortion that has occurred during bonding.

7 Claims, 1 Drawing Sheet

PROCESS FOR CHANGING THE BEND OF ANODICALLY BONDED FLAT COMPOSITE BODIES MADE OF GLASS AND METAL OR SEMICONDUCTOR MATERIALS

BACKGROUND

1. Field of the Invention

The invention relates to a process for changing the flexion of anodically bonded two-dimensional composites of glass and metal or semiconductor material.

2. Description of the Prior Art

Anodic bonding is a technique for bonding metals or semiconductor materials to glass. It is characterized by applying an electric field at a process temperature below the transformation temperature Tg of the glass and is described, for example, in U.S. Pat. Nos. 3,397,278 and 3,417,459.

In anodic bonding, a polished glass plate is. brought into intimate contact with a polished plate of metal or semiconductor material. The application of a direct voltage between the bonding partners so that the glass is given a cathode potential while the semiconductor/metal is given an anode potential causes the alkali metal ions of the glass to migrate in the direction of the cathode at elevated temperatures. The negatively charged oxygen ions generated on the interface towards the bonding partner are firmly bound in the glass network, producing a strong electrostatic attraction between the glass and the semiconductor/metal. This attraction causes the bonding partners to approach each other down to the atomic range. The irreversible chemical bonding between glass and the metal or semiconductor material results from the formation of oxygen bridges between the bonding partners.

EP 0 139 334 A2 teaches a three-ply composite which consists of a GaAs layer, a support glass (verre de soutien) and a buffer glass (verre de tampon) located between the semiconductor layer and the support glass. The softening temperature of the buffer glass lies below that of the support glass, being softened, or stress-relieved, at the desorption temperature. During desorption, the entire composite is stress-relieved, as the support glass and semiconductor layer "float" on the soft buffer glass layer, freely expanding or contracting. During subsequent cooling, strains corresponding to the differences in the coefficients of expansion re-occur which are compensated by a third glass.

Typical bonding voltages lie in the range of 50 to 1000 volts. The possible bonding temperature range is limited at the lower end by alkali mobility (about 250° in the case of borosilicate glass) and, at the upper end, by the transformation point of the glass (about 520° for borosilicate glass). Anodic bonding above the transformation point is possible, but can cause plastic deformation of the glass which should contain a minimum quantity of alkali metal ions. In the case of the commonly employed glasses, the proportion is in the range of (1 to 5) atomic percent (Schott 8330≈3%, Hoya SD2≈2%). At the present time, Schott 8330 and Corning 7740 glasses are very frequently used for anodic bonding.

One general purpose of the bonding is to obtain a base and/or cover of glass for thin layers of metal or semiconductor and/or to assemble a component. Known applications of bonding are the stabilization and encapsulation of sensors of microstructured silicon (e.g. pressure and acceleration sensors), the covering of fluidic structures of microstructured silicon (i.e., channels, valves and the like) and the generation of micromechanical actors based, for example, on piezo-electrically-deflected glass membranes over pumping chambers structured in silicon.

After bonding, the composites obtained are cooled to room temperature. Such cooling process takes several minutes depending on the thickness of the composites.

Undesired strains between the mutually-bonded materials, leading to undesired flexions of the components, arise during the cooling that follows anodic bonding. Such strains are due, inter alia, to non-optimally matched coefficients of expansion of the metal or semiconductor material and the glass concerned as well as inhomogeneous temperatures in the bond structure. It is sometimes possible to reduce such strains by employing a more homogeneous temperature distribution during bonding or by using a glass having a more closely-matched coefficient of expansion. This frequently suffers from the disadvantage that the altered glass type has changed bonding properties which possibly no longer represent the optimum.

According to the state of the art, no process is known that makes it possible to remove the mechanical strains, and hence the flexions, present after the cooling of bonding specimens, from the component.

SUMMARY AND OBJECTS OF THE INVENTION

It is an object of the invention to provide a process for changing the flexion of anodically-bonded two-dimensional composites.

It is another object of this invention to provide such a method whereby flexion that has occurred during the preparation of anodically-bonded two-dimensional composites can be reversed.

It is yet another object of this invention to provide such a process for producing anodically-bonded two-dimensional composites that are planar or possess a defined curvature.

The present invention addresses the foregoing and other objects by providing, in a first aspect, a method for changing the flexion of anodically-bonded two-dimensional composites of predetermined glass and metal or semiconductor material. Such method involves the step of bonding the composite as rapidly as possible for the predetermined materials. The bonded composite is immediately cooled then subjected to a temperature treatment in the range of 250° C. and 10° C. below the transformation temperature of the glass of the composite to achieve a change in flexion by compaction of the glass.

In a second aspect, the invention provides a method for producing planar, anodically-bonded composites of glass and metals or semiconductor materials which show convex deformation after bonding on the glass side of the composite. Such method includes the step of immediately after bonding, cooling said composite and then heating the composite to temperatures in the range of 250° C. and Tg–10 K until flexion of the composite has reverted as a result of compaction of the glass.

The foregoing and other features and advantages of this invention will become further apparent from the detailed description that follows. Such description is accompanied by a set of drawing figures. Numerals of the drawing figures, corresponds to those of the written description, point to the various features of the invention. Like numerals refer to like features throughout both the written description and drawing figures.

DETAILED DESCRIPTION OF THE PREFERRED EMBODIMENT

An essential point of the invention lies in the recognition that planarization can occur only if the bonded composite is convex, when viewed from the glass side. This is the general case whenever the coefficient of expansion of the glass is less than that of the bonding partner. While the expansion curve of glasses is nearly linear from below room temperature virtually to Tg, the transformation temperature of the glass used as bonding partner, the expansion curve of Si (the most frequently employed bonding partner) is not at all linear. As a result, not only the coefficient of expansion but also the bonding temperature of the glass has a very great influence on the direction of the flexion, dependent upon the part of the expansion curve that the bonding temperature lies. In general, glasses whose coefficients of expansion at room temperature are as similar as possible to that of Si, are used for bonding to Si. However, after bonding such composites are, in general, more or less convex.

The basis of the process of the invention is to subject the anodically bonded two-dimensional composite of glass and semiconductor material or metal to an additional temperature treatment at between 250° C. and Tg–10 K. Preferably, the composite is heated for 0.05 to 20 hours to temperatures between 300° C. and Tg–20 K, and, in particular, for 0.2 to 6 hours to temperatures between 350 and Tg–40 K.

The thicknesses of the glass and semiconductor or metal discs to be bonded to one another are generally between 0.1 to 4 mm for the glass disc used as the base or cover and 0.2 to 1.0 mm for the semiconductor or metal, the most frequently used semiconductor material being silicon.

Figure 1:
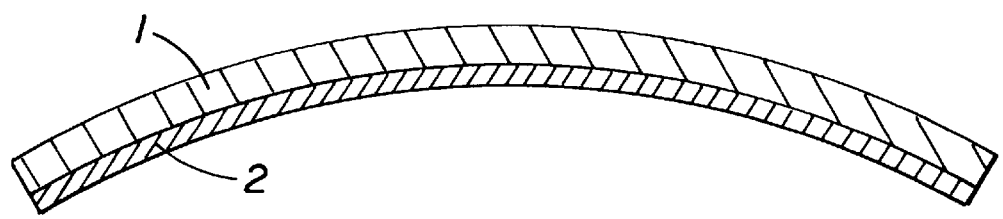
FIG. 1 is a cross-sectional view (not to scale) of a anodically-bonded composite of glass and metal or a semiconductor material.
Figure 2A:
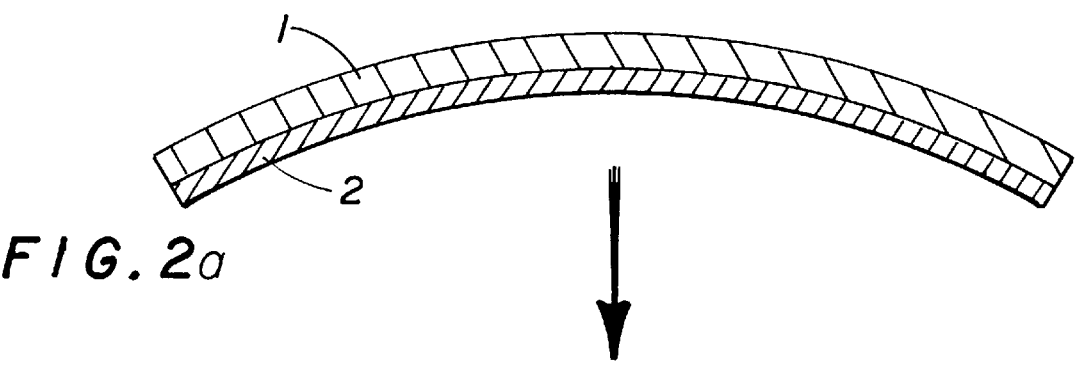
FIGS. 2a, 2b and 2c are a series of cross-sectional views of an anodically-bonded composite for illustrating the bending that occurs in response to heat treatment in accordance with the invention.
Figure 2B:
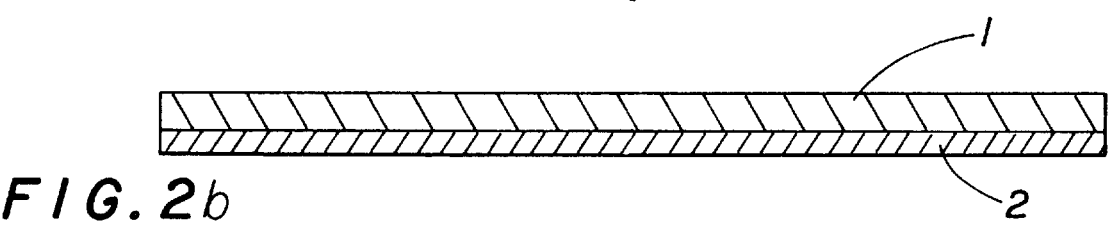
Figure 2C:

After bonding of, for example, 0.4 mm silicon wafers to 0.73 mm thick borosilicate glass discs (SCHOTT 8330, TEMPAX), the flexion or deviation from planarity amounts to about 100 μm per 7.62 cm (3"). After bonding, the composite is bent in the direction of the glass side, as illustrated in FIG. 1, a diagrammatic representation (not true to scale) of a section perpendicular to the surface of the bonded composite. Referring to FIG. 1, the composite consists of a glass plate 1 and a semiconductor or metal plate 2. As a result of temperature treatment in accordance with the invention, compaction of the glass is achieved, and the flexion towards the opposite side occurs as metals and semiconductor materials do not exhibit such compaction. The change in bending therefore always takes place from the glass side in the direction of the metal or semiconductor side. Bending due to temperature treatment in accordance with the invention is illustrated in the series of FIGS. 2a through 2c. FIG. 2a shows, analogously to 1 in FIG. 1, a composite immediately after bonding. Due to the temperature treatment, bending of the composite occurs in the direction of the arrow. The achievable compaction is dependent upon the thermal pretreatment of the glass specimens. Technical borosilicate glasses, for example, achieve a maximum compaction of up to 550 ppm. Such glasses are used in large quantities for bonding and are commercially available, for example, under the brand names DURAN, PYREX or TEMPAX. Dependent upon the duration of the temperature treatment, bending can be continued until the bending, which has taken place during bonding, has been compensated, as shown in FIG. 2b, or, if desired, the bending occurring during bonding can overcompensate, resulting in flexion to the opposite side (i.e., in the direction of the silicon layer) as shown in FIG. 2c. The higher the chosen temperature, the shorter the required treatment times. A temperature of Tg–10 K should, however, not be exceeded, since this enters the region in which the glass fundamentally changes its mechanical behavior from elastic to viscous flow.

The temperature below which a change in the, flexion still occurs only in disproportionately long, and therefore uneconomical, periods differs from glass type to glass type. This can be easily determined by one skilled in the art. Thus, for example, the temperature for borosilicate glass should not be less than 300° C. Otherwise the heat-treating times for the desired effect are unnecessarily prolonged.

A temperature range from 350° C. up to about Tg–40 K is preferred, because this range extends from fine grading up to the optimum achievable influenceability, depending on the user's requirements.

The treatment time should be between 0.05 and 20 hours. If the upper limit is exceeded, the long residence time entails high costs. Should the time be less than 0.05 hour, uniform heating of the charge and hence uniform bending problems increasingly arise. Most advantageously, residence times from 0.2 to 6 hours are generally employed, in particular 1–4 hours, because uniform heating of the charge can be readily insured in that range and the costs are not excessively high.

At treatment times of 0.05 hour, only a reduction in curvature is presently achievable, times of at least 10 minutes are in general necessary to produce planar specimens, depending on the bonding conditions.

If, in a first treatment, bodies with an insufficient change in flexion are obtained, a second or additional treatments, if appropriate at other temperatures and/or for other times, are possible to further correct the bodies without any problems.

Likewise, particularly accurate amounts of bending are possible via an on-line control of the bending of the pieces during the heat treatment that allows for further bending during cooling to room temperature, and a corresponding termination of the heat treatment step. A person skilled in the art can readily determine the additional bending, which takes place during the cooling to room temperature. Alternatively, this can be calculated if the coefficients of thermal expansion, the moduli of elasticity and the transversal contraction numbers of the bonding partners are known.

The process is reversible. Should the flexion be excessively changed, the body can be heated to the Tg range to reverse the resulting change in flexion. The curvature obtained in the end effect is then at least of the same sign as after anodic bonding; the magnitude is largely dependent upon cooling conditions below the Tg. For technological utilization, however, the reversal process is only rarely of interest, as fully processed wafers (especially those with Al conductor tracks) can be heated only to a maximum of 450° C. (see Example 4 below). The process according to the invention can again be applied to the body to obtain desired flexion.

The process can be begun not only with a cooled composite. It is also possible to join the process directly and without intermediate cooling to the bonding step. This is particularly feasible when the times of the temperature treatment can be kept short. In such a case, the treatment can be carried out while still in the bonding chamber or a directly-adjoining temperature treatment device (e.g. a short continuous oven.) Short times for temperature treatment are generally possible when bonding has been carried out within a short time. A possible scientific explanation for this relationship is as follows: the compaction of the glass, which is the basis of the present process, is non-linear with respect to time. Fresh glass initially compacts quickly (at constant temperature). That is to say, it compacts at first at relatively high rate, but increasingly slowly as compaction continues. To achieve a defined degree of compaction, more time is thus always required, with more required to the extent that the glass had been compacted beforehand. For bonding, the glass must be heated to temperatures at which a compaction also already takes place. The longer the duration of heating in connection with bonding, the longer also the duration of compaction. As a result, however, a greater or lesser portion of the range, within which the glass compacts rapidly, is consumed during bonding, so that the temperature treatment of the invention requires more time. The shorter the bonding time, the less consumed (for compaction) the glass. The less consumed the glass (within the sense of a compaction), the faster compaction proceeds, and the shorter the times required for temperature treatment. Should, in the future, bonding times be applied that are significantly less than the bonding times of about 15 minutes that are at currently technically required, times even shorter than 10 minutes will be possible for the temperature treatment to produce planar composites.

Employing the process of the invention, anodically bonded two-dimensional composites can be specifically bent. In this way, it is possible for the first time to bend back, for example, composites of silicon and borosilicate glass (TEMPAX®, DURAN®, PYREX®) that are bent after the anodic bonding due to the different coefficients of thermal expansion for silicon and glass, to the absolutely planar condition and, if desired, even in the opposite direction.

The process is further explained by reference to the examples which follow:

EXAMPLE 1

A composite having a diameter of 76.2 mm (3") and consisting of a silicon wafer having a thickness of 0.4 mm and a glass disc consisting of borosilicate glass No. 8330 made by Schott Glaswerke and having a thickness of 0.73 mm was heated to a temperature of 500° C. and anodically bonded by a 400 volt bonding voltage. The bonding step took 20 seconds. The composite was then cooled to 400° C. in the usual manner at a rate of 1 K/minute and subsequently quenched to room temperature within about 5 minutes. After this first step, its radius of curvature was +7.2 m (flexion +100 $\mu$m). (Here and below, the sign is defined such that, in the case of a "plus", the glass side is. convex.) During a subsequent heat treatment at 300° C. for 4 hours, there was no significant change in curvature. Afterwards, the radius was determined to be +7.05 m (+102 $\mu$m). This small increase in flexion is within the range of the accuracy of measurement. It can be seen that, for such glass, the temperature at 300° C. represents a limit at which unacceptably long treatment times must be expected.

EXAMPLE 2

A composite of the same materials and geometry as in Example 1 was heated to a temperature of 460° C. and anodically bonded within a time of 100 seconds at a voltage of 500 V. After the end of the bonding step, the composite was cooled down to 400° C. at a rate of 1 K/minute, then quenched to room temperature. After this bonding step, the radius of curvature was +7.1 m (flexion +101 $\mu$m).

After a heat treatment for 4 hours at 400° C., the radius of curvature grew to +9.1 m (flexion +79 $\mu$m). At a process temperature of 400° C., significant compaction of the glass was already evident.

EXAMPLE 3

A pairing of materials analogously to Examples 1 and 2 was heated to a temperature of 420° C. and bonded at 600 V. The bonding step took 160 seconds. This was followed by cooling, as in Examples 1 and 2, at a rate of 1 K/minute, to 400° C. and subsequent quenching to room temperature. After this process, the composite had a radius of curvature of +7.5 m (flexion +95 $\mu$m). Subsequent heat treatment at 450° C. for 4 hours resulted in a radius of curvature of −11.6 m (flexion −62.1 $\mu$m). Not only was the curvature of the composite reduced, but negative curvature successfully generated. The composite was "overcompensated". It is thus possible, with this technology, not only to produce planar, but also negatively-bent glass-silicon bonds.

EXAMPLE 4

The same composite as in Example 3 was, after the overcompensation, heated to 570° C. (=Tg+50 K) and maintained for one hour. After such time, it was quenched to room temperature at a rate of about 5 minutes. Its radius of curvature was then +7.8 m (flexion +93 $\mu$m). The heating above Tg relieved the composite and the glass structure assumed its original properties. Below the cooling range, quenching again produced a glass whose state of expansion is very similar to that of the initial state. The relieving process according to the invention is thus repeatable as desired.

EXAMPLE 5

A silicon wafer and a glass disc corresponding to Examples 1 to 4 were anodically bonded at 570° C. (=Tg+50 K) at a bonding voltage of 100 V. The bonding step took about 10 minutes. The composite was then cooled to a temperature of 490° C. at a rate of 2 K/minute. After subsequent rapid cooling to room temperature, its radius of curvature was +52.1 m (flexion +13.9 $\mu$m). Subsequent heat treatment at 450° C. for 2 hours generated a radius of curvature of −51.6 m (flexion −14 $\mu$m).

The magnitude and reproducibility of a possible change in the flexion of a glass depends very greatly upon its thermal history. If this is not known, or only inaccurately known, it is possible, as shown, by bonding above Tg and subsequent defined cooling, to obtain well-defined and reproducible starting conditions for the process for changing the flexion, without additional steps.

While this invention has been illustrated with respect to its presently-preferred embodiment, it is not limited thereto. Rather, the invention is only limited insofar as it is defined by the following set of patent claims and includes within its scope all equivalents thereof.

What is claimed:

1. A method for changing the flexion of an anodically-bonded planar composite of predetermined glass and metal or semiconductor materials, comprising the steps of:

a) anodically bonding said predetermined glass with said metal or said semiconductor material as rapidly as possible, wherein after anodically bonding said glass has an unbonded surface, said composite being convexly curved when viewed from said unbonded glass side; then b) immediately cooling said anodically bonded composite; and then c) subjecting said anodically bonded and cooled composite to an additional heating to a temperature range of 250° C. to 10° C. below the glass transition temperature of the glass of the composite to achieve a change in flexion for said convexly curved shape to a flat planar shape by heating alone.

2. A method as recited in claim 1, characterized in that said composite is treated for 0.05 to 20 hours at temperatures in the range of 300° C. to Tg–20 K.

3. A method as recited in claim 1, characterized in that said composite is treated for 0.2 to 6 hours at temperatures in the range of 350° C. to Tg–40 K.

4. A method as recited in claim 1 further comprising the steps of:

a) measuring said flexion continuously during said temperature treatment; and then b) terminating said temperature treatment as soon as a predetermined curvature is reached.

5. A method for producing planar, anodically bonded composites from glass and metals or semiconductor materials, which show convex deformation after anodically bonding on the glass side, said method including the step of, immediately after anodically bonding, cooling said anodically bonded and cooled composite and then heating said composite to temperatures in the range of 250° C. to Tg–10 K until flexion of said composite has reverted from said convex deformation to a flat, planar shape by heating alone.

6. A method as recited in claim 1 wherein the step of cooling said composite to room temperature before said heat treatment.

7. A method as recited in claim 5 including the step of cooling said composite to room temperature before said heat treatment.

* * * * *